(No Model.)

C. L. BELLAMY.
DUST PAN.

No. 446,225. Patented Feb. 10, 1891.

Witnesses:
John Buckler,
Gertrude Ward.

Inventor:
C. L. Bellamy,
By A. M. Pierce.
Atty

UNITED STATES PATENT OFFICE.

CHARLES L. BELLAMY, OF ARLINGTON, NEW JERSEY.

DUST-PAN.

SPECIFICATION forming part of Letters Patent No. 446,225, dated February 10, 1891.

Application filed November 22, 1889. Serial No. 331,187. (No model.)

*To all whom it may concern:*

Be it known that I, CHARLES L. BELLAMY, a citizen of the United States, and a resident of Arlington, in the county of Hudson and State of New Jersey, have invented certain new and useful Improvements in Dust-Pans, of which the following is a specification.

My invention relates especially to devices employed for removing dust and sweepings from the floor or carpet when collected together by a broom or brush, and has for its object the provision of a dust-pan cheap and simple to construct and effective and convenient to use.

To attain the desired end my invention consists, essentially, in a dust-pan formed of a single piece of metal, having a flat portion and sloping portion on one side and a sloping portion terminating at a receptacle for dust upon the other, three sides of the pan being provided with a rim formed integral therewith. Suitable spurs are provided to prevent the pan slipping while in use, and a manipulating-handle is also attached thereto, all of which will be hereinafter first fully described, and then pointed out in the claims.

Figure 1:
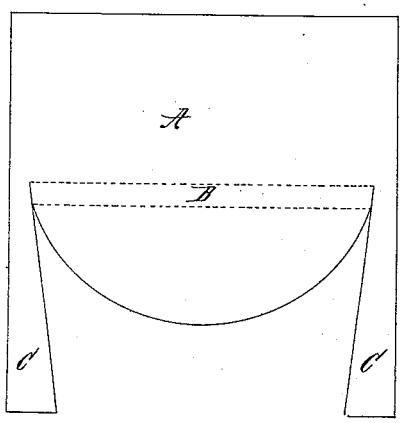
Figure 2:
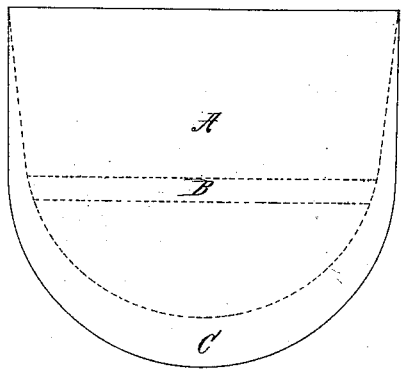
Figure 3:
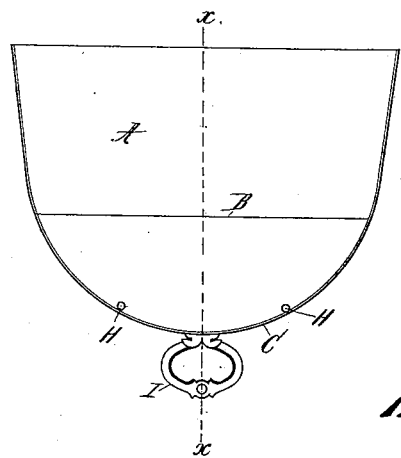
Figure 4:
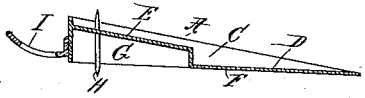
Figure 5:
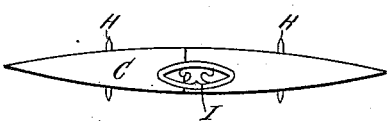

In the drawings, Figure 1 shows a cut blank from which the dust-pan is formed. Fig. 2 illustrates the blank from which the pan is formed by stamping. Fig. 3 is a plan view of a completed dust-pan. Fig. 4 is a vertical sectional view at line *x* *x* of Fig. 3. Fig. 5 is a rear elevation of the pan.

Like letters of reference indicate corresponding parts.

A is the body of the pan, having a right-angular bend at B.

C is the rim, either bent around and soldered together at the center of the back of the pan and to the body thereof, as illustrated by Figs. 1, 3, 4, and 5, or stamped up, as illustrated by Fig. 2. This method of construction gives a flat portion D and a sloping portion E when the pan is used in the position indicated in Fig. 4; but when reversed it gives a sloping position F and a receptacle G for the dust.

H are pointed spurs secured to the rim of the pan, designed to hold it from slipping when in use, and I is a manipulating-handle.

Having now fully described my invention, what I claim as new therein, and desire to secure by Letters Patent, is—

1. A reversible dust-pan stamped from a single piece of metal and consisting of a flat front portion having an upturned rim on each side thereof, a sloping portion at the back in a different plane from the front portion and connected to the rear of the front portion by a vertical strip, and the rim extending around such inclined portion, whereby the pan is provided on one side with a flat front dust-receiving portion and on the other with an inclined front and dust-receptacle in the rear, substantially as described.

2. A reversible dust-pan one side of which has a flat portion and a sloping portion and the other side a sloping portion terminating at a receptacle having a surrounding rim, vertical pointed spurs being fixed near the back of the pan and projecting from both sides thereof, substantially as shown and described.

3. A dust-pan in which is comprised a body made of a single piece of metal, one side having a flat portion and a sloping portion and the other side a sloping portion and a dust-receptacle, a rim upon three sides of the body formed integral therewith, double-pointed spurs fixed to the back of the pan, and a manipulating-handle, the whole combined and arranged substantially as shown and described.

Signed at New York, in the county of New York and State of New York, this 11th day of November, A. D. 1889.

CHARLES L. BELLAMY.

Witnesses:
    A. M. PIERCE,
    GERTRUDE WARD.